(12) United States Patent
Brombach et al.

(10) Patent No.: US 10,683,846 B2
(45) Date of Patent: Jun. 16, 2020

(54) METHOD FOR CONTROLLING A WIND TURBINE

(71) Applicant: Wobben Properties GmbH, Aurich (DE)

(72) Inventors: Johannes Brombach, Berlin (DE); Katharina Schubert, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/326,574

(22) PCT Filed: Aug. 21, 2017

(86) PCT No.: PCT/EP2017/071017
§ 371 (c)(1),
(2) Date: Feb. 19, 2019

(87) PCT Pub. No.: WO2018/033646
PCT Pub. Date: Feb. 22, 2018

(65) Prior Publication Data
US 2019/0211803 A1 Jul. 11, 2019

(30) Foreign Application Priority Data
Aug. 19, 2016 (DE) .................... 10 2016 115 431

(51) Int. Cl.
*F03D 9/25* (2016.01)
*F03D 9/00* (2016.01)
*F03D 7/02* (2006.01)

(52) U.S. Cl.
CPC ............ *F03D 9/257* (2017.02); *F03D 7/022* (2013.01); *F03D 9/007* (2013.01); *F03D 9/255* (2017.02);
(Continued)

(58) Field of Classification Search
USPC ........................ 290/44, 55; 307/66, 72, 73
See application file for complete search history.

(56) References Cited

U.S. PATENT DOCUMENTS

| | | | | | |
|---|---|---|---|---|---|
| 5,075,564 | A | * | 12/1991 | Hickey | ............... B63H 9/06 290/55 |
| 5,254,876 | A | * | 10/1993 | Hickey | ............ F03D 1/0608 290/55 |

(Continued)

FOREIGN PATENT DOCUMENTS

| | | |
|---|---|---|
| CN | 102185526 A | 9/2011 |
| CN | 104682420 A | 6/2015 |

(Continued)

*Primary Examiner* — Pedro J Cuevas
(74) *Attorney, Agent, or Firm* — Seed IP Law Group LLP

(57) ABSTRACT

A method for controlling at least one wind power installation for generating electrical energy from wind for infeed into an electrical supply network is provided. The wind power installation has a rotor that can be operated at a variable rotor rotational speed and rotor blades having adjustable blade angles and coupled to the aerodynamic rotor, for generating a generator power. The wind power installation is operated in a normal mode in which it feeds available wind power up to a rated power into the network and the available wind power indicates a power which can be obtained from the wind and fed into the network depending on the wind and technical limitations of the wind power installation. The wind power installation changes from the normal mode to a support mode depending on an operating situation of at least one solar installation which feeds into the same network.

21 Claims, 4 Drawing Sheets

(52) U.S. Cl.
CPC . *F05B 2270/107* (2013.01); *F05B 2270/1033* (2013.01); *Y02E 10/725* (2013.01)

(56) References Cited

U.S. PATENT DOCUMENTS

| | | | | |
|---|---|---|---|---|
| 7,045,702 | B2* | 5/2006 | Kashyap | F03D 9/007 |
| | | | | 136/244 |
| 8,432,053 | B2* | 4/2013 | Frayne | F03D 7/026 |
| | | | | 290/44 |
| 8,487,469 | B2* | 7/2013 | Christy | F03D 9/007 |
| | | | | 290/55 |
| 8,847,425 | B2* | 9/2014 | Jordan, Sr. | F03D 9/007 |
| | | | | 290/55 |
| 8,866,334 | B2* | 10/2014 | Donnelly | H02J 1/10 |
| | | | | 290/2 |
| 8,872,379 | B2* | 10/2014 | Ruiz | B60L 53/53 |
| | | | | 307/66 |
| 9,366,229 | B2 | 6/2016 | Krueger | |
| 9,845,790 | B2 | 12/2017 | de Boer et al. | |
| 9,859,839 | B2* | 1/2018 | Pugina | H02S 10/12 |
| 10,056,758 | B2 | 8/2018 | Unru et al. | |
| 10,063,093 | B2 | 8/2018 | Beekmann | |
| 10,094,361 | B2* | 10/2018 | Bardia | F03D 9/007 |
| 2007/0090653 | A1* | 4/2007 | Martelon | F03D 9/007 |
| | | | | 290/55 |
| 2008/0196758 | A1* | 8/2008 | McGuire | F03D 9/007 |
| | | | | 136/245 |
| 2010/0090605 | A1* | 4/2010 | Nevins | H02S 10/10 |
| | | | | 315/159 |
| 2010/0133850 | A1* | 6/2010 | Winkler | F03D 3/005 |
| | | | | 290/55 |
| 2010/0183443 | A1* | 7/2010 | Thorne | F03D 9/007 |
| | | | | 416/146 R |
| 2010/0207453 | A1* | 8/2010 | Ottman | F03D 9/007 |
| | | | | 307/72 |
| 2010/0225266 | A1* | 9/2010 | Hartman | B60L 11/1825 |
| | | | | 320/101 |
| 2010/0289269 | A1* | 11/2010 | Christy | F03D 9/007 |
| | | | | 290/55 |
| 2010/0314876 | A1* | 12/2010 | Frayne | F03D 7/026 |
| | | | | 290/44 |
| 2011/0057445 | A1 | 3/2011 | Acedo Sánchez et al. | |
| 2011/0204720 | A1* | 8/2011 | Ruiz | B60L 55/00 |
| | | | | 307/66 |
| 2011/0215640 | A1* | 9/2011 | Donnelly | H02J 1/10 |
| | | | | 307/21 |
| 2011/0221193 | A1* | 9/2011 | Kalen | F03D 7/0212 |
| | | | | 290/44 |
| 2011/0221203 | A1* | 9/2011 | Miller | F03D 9/007 |
| | | | | 290/55 |
| 2012/0112546 | A1* | 5/2012 | Culver | H02J 7/0029 |
| | | | | 307/66 |
| 2013/0106193 | A1* | 5/2013 | Bryson | F03D 9/007 |
| | | | | 307/73 |
| 2015/0280489 | A1* | 10/2015 | Curlett | H02J 9/00 |
| | | | | 307/66 |
| 2015/0308409 | A1* | 10/2015 | Patel | F03D 7/06 |
| | | | | 290/50 |
| 2016/0065115 | A1 | 3/2016 | Pugina | |
| 2016/0108893 | A1* | 4/2016 | Agtuca | H02S 20/30 |
| | | | | 290/44 |
| 2017/0096985 | A1* | 4/2017 | Bardia | F03D 9/007 |
| 2019/0036342 | A1* | 1/2019 | Brombach | H02J 3/386 |
| 2019/0067943 | A1* | 2/2019 | Brombach | H02J 3/01 |

FOREIGN PATENT DOCUMENTS

| | | | |
|---|---|---|---|
| CN | 205039611 U | 2/2016 | |
| DE | 29715248 U1 | 12/1998 | |
| DE | 102009037239 A1 | 2/2011 | |
| DE | 10 2011 081 795 A1 * | 8/2011 | F03D 7/00 |
| DE | 102011081795 A1 | 2/2013 | |
| DE | 102013101099 A1 | 8/2014 | |
| DE | 102013203540 A1 | 9/2014 | |
| DE | 102014101809 A1 | 8/2015 | |
| EP | 2763263 A2 | 8/2014 | |
| RU | 2133375 C1 | 7/1999 | |
| RU | 162099 U1 | 5/2016 | |
| RU | 201414646 A | 5/2016 | |
| WO | 2014118059 A1 | 8/2014 | |
| WO | 2015/123549 * | 2/2015 | H02J 3/46 |
| WO | 2015123549 A1 | 8/2015 | |

\* cited by examiner

METHOD FOR CONTROLLING A WIND TURBINE

BACKGROUND

Technical Field

The present invention relates to a method for controlling at least one wind power installation. The present invention also relates to a corresponding wind power installation, and it relates to a wind farm comprising a plurality of wind power installations of this kind. The present invention also relates to a wind power system comprising at least one wind farm and at least one solar installation.

Description of the Related Art

Wind power installations are known and are provided, in principle, for drawing energy from the wind and feeding said energy into an electrical supply network as electric current. In addition to this task, wind power installations also more and more frequently perform tasks for supporting the electrical supply network.

This increasing importance of network support is therefore also partly related to the increase in the proportion of decentralized energy infeed devices which, in addition to wind power installations, also include photovoltaic systems in particular. Therefore, it is desirable for decentralized energy infeed devices to also be able to make a contribution to supporting the network; it is desirable at least for some of these decentralized infeed devices to be able to make a contribution of this kind.

One problem which is often mentioned in respect of supporting the electrical supply network by means of wind power installations is that the ability of said wind power installations to feed in additional power for network support depends on the prevailing weather situation. In other words, the problem can arise that, when there is little wind or when there is no wind at all, wind power installations can feed in little or absolutely no support power.

In fact, a similar problem is also mentioned for photovoltaic systems which, of course, can generate current only during the day, particularly when the sun is shining.

In principle, wind power installations have the potential to store kinetic energy, in particular, in their rotors in order to be able to thereby provide, for example, instantaneous reserve. However, providing positive instantaneous reserve from said kinetic energy in this way will only be possible if the rotor of the wind power installation in question is also rotating. If the rotor of the wind power installation is rotating, it is then possible to provide an instantaneous reserve, that is to say to briefly increase the fed-in power. However, infeed of instantaneous reserve in this way is not known in the case of photovoltaic systems. At best, said infeed could be realized by precautionary reduction or the provision of an energy store.

The German Patent and Trademark Office has performed a search of the following prior art in the priority application pertaining to the present application: DE 10 2011 081 795 A1, DE 10 2013 101 099 A1, DE 10 2013 203 540 A1, DE 10 2014 101 809 A1, US 2011/0057445 A1, US 2016/0065115 A1, WO 2014/118059 A1, DE 10 2009 037 239 A1 and DE 297 15 248 U1.

BRIEF SUMMARY

Improving network integration of renewable energies and realizing an instantaneous reserve provision in a network at any time and as much as possible are desired. Achieving or at least rendering possible as high a level of coverage as possible by renewable energy sources when generating power is desired. Avoiding a network-related upper limit, when adding renewable energy sources on account of a lack of network support, is desired.

Provided is a method for controlling at least one wind power installation for generating electrical energy from wind for infeed into an electrical supply network. The method for controlling one wind power installation can correspondingly be transferred to controlling a plurality of wind power installations. In particular, each wind power installation preferably controls its operating point automatically but, for coordination purposes, can additionally receive guidelines which can be coordinated and provided, in particular, by a superordinate control unit, such as a farm controller for controlling a wind farm for example.

The wind power installation has an aerodynamic rotor with rotor blades which can be adjusted in respect of their blade angle. In principle, a single rotor blade may also be sufficient, but this has been found to be unsuitable in principle nowadays. In addition, the rotor can be operated at a variable rotor rotational speed. The rotor rotational speed can depend on the selected operating point particularly in the partial load range when the wind speed has not yet reached a rated wind speed. However, in principle, the rotor rotational speed is variable and prespecifiable, within reasonable limits.

A generator, which generates a generator power, is coupled to the aerodynamic rotor.

The wind power installation is operated in a normal mode in which it feeds available wind power up to a rated power into the electrical supply network. The available wind power and therefore as much power as possible is obtained from the wind and fed into the electrical supply network in this normal mode, provided that the wind is still so weak that it cannot deliver a rated power. If the wind speed reaches the rated wind speed and exceeds said rated wind speed, the power has to be limited to a rated power in order to protect components of the wind power installation. An operating point which depends on the wind speed is generally also associated with this normal mode.

The wind power installation changes over from a normal mode to a support mode depending on an operating situation of at least one solar installation which feeds into the same electrical supply network. The wind power installation can therefore also be operated in a support mode which differs from the normal mode. It is proposed here that this support mode takes place depending on a solar installation which feeds into the same network. This is proposed particularly for photovoltaic systems in which the respectively fed-in power fluctuates virtually without delay with the irradiated solar power and which usually have virtually no energy stores. Therefore, particularly in the case of photovoltaic systems, the problem can arise that said power is not suitable for providing an instantaneous reserve. Nevertheless, other solar installations can also be assisted by said power.

Provision is particularly made here for the wind power installation to feed in more instantaneous reserve, to be able to feed in more instantaneous reserve or to at least offer more instantaneous reserve in the support mode than in its normal mode. However, it is also considered that the wind power installation makes a higher support contribution for supporting the electrical supply network in said support mode than in the normal mode.

Provision is particularly made for said support mode to be selected when the at least one photovoltaic system which feeds into the same electrical supply network, which can also be referred to as network for simplicity, feeds comparatively more electrical power into the network, in particular when it feeds in at its rated power. In other words, the support mode of the at least one wind power installation is proposed here when there is a large amount of solar radiation.

It has been specifically identified that there is generally a correlation between a high level of solar radiation and therefore a large amount of fed-in solar power on the one hand and weak wind and therefore a small amount of fed-in solar power on the other hand. In this respect, it is now proposed to provide the at least one wind power installation in a case of this kind for the purpose of making a comparatively large contribution to supporting the electrical supply network. The provision or at least offer of instantaneous reserve in particular can also be undertaken by a wind power installation in a situation of this kind virtually for the at least one said feeding-in photovoltaic system.

As a result, it is possible to achieve the situation that a large amount of photovoltaic power can be fed in in the case of strong solar radiation, while at the same time a high level of support potential, particularly instantaneous reserve, which the photovoltaic solar installations themselves could not provide can be provided. As a result, photovoltaic systems and wind power installations can advantageously complement one another by virtue of the photovoltaic systems providing infeed and the wind power installations providing support in the case of strong solar radiation.

However, in principle, the at least one wind power installation can also enter the support mode when it can also feed in a certain amount or even a large amount of wind power itself. Although it has been identified that there is a correlation between a large amount of solar radiation and little wind, the proposed solution can also be used in the rare cases in which there is a large amount of solar radiation and, at the same time, a large amount of wind.

Therefore, it is preferably proposed that the wind power installation can provide more instantaneous reserve in the support mode than in the normal mode.

According to one embodiment, it is proposed that an instantaneous reserve power ($P_M$) is fed into the electrical supply network depending on a change in frequency (df/dt) of a network frequency (f) which is detected in the electrical supply network, wherein different dependencies of the instantaneous reserve power $P_M$ on the change in frequency df/dt are provided between the normal mode and the support mode in such a way that, in the case of the same change in frequency df/dt, the magnitude of the instantaneous reserve power $P_M$ in the support mode is greater than in the normal mode. An instantaneous reserve which is fed into the electrical supply network depending on the change in frequency serves particularly to counteract changes in frequency. Counteraction of this kind is intended to take place as quickly as possible, that is to say immediately. Therefore, the term instantaneous reserve power, or instantaneous reserve for simplicity, is also used and said term "instantaneous reserve" is also used synonymously for instantaneous reserve power in the text which follows.

The infeed of an instantaneous reserve of this kind is suitable for supporting the electrical supply network and is therefore desirable. Nevertheless, it should be noted that the infeed of an instantaneous reserve of this kind can also represent a load for the feeding-in wind power installation. The rapid increase in the fed-in power in particular, especially if this increase reaches design limits, can subject the components to loading as a result. In addition, losses in power can also be caused as a result because the wind power installation at least briefly leaves its optimum operating point in the process. In particular, the use of oscillating energy from the rotating rotor of the wind power installation causes braking of said rotor, this possibly leading firstly to the aerodynamically optimum operating point also being left but secondly also possibly leading to mechanical loading of the installation.

The infeed of an instantaneous reserve is therefore not necessarily desirable for the operator of the wind power installation.

Therefore, it is proposed that less instantaneous reserve is fed in or offered in the normal mode than in the support mode. The infeed of an instantaneous reserve generally depends on the detection of a change in frequency of the voltage of the electrical supply network, specifically on the change in frequency df/dt. It is now proposed that the response to a change in frequency is weaker in the normal mode than in the support mode.

Accordingly, less instantaneous reserve is provided, that is to say fed in, in the normal mode than in the support mode in the case of a change in frequency of equal magnitude.

The instantaneous reserve power $P_M$ can preferably be calculated using the following formula:

$$P_M = k \cdot df/dt$$

Here, k forms a dependency factor which, in respect of magnitude, is greater in the support mode than in the normal mode. The dependency factor k therefore determines the relationship between the instantaneous reserve power $P_M$ to be fed in from the change in frequency df/dt and can, in this case, be set at a different magnitude for the normal mode and the support mode. The magnitude of said dependency factor is set to be larger for the support mode. Since instantaneous reserve is intended to be fed in for support purposes in the case of a reduction in frequency, that is to say a negative df/dt, the dependency factor k will usually have a negative value. In this case, instead of the dependency factor k, it is also possible, for example, for a function to be used and further criteria may be included, such as taking into account limit values or starting values for example. Boundary conditions can also be taken into account, for example that a limit value of an absolute deviation in frequency first has to be exceeded in respect of magnitude. The dependency factor k in the case of the support mode is preferably at least twice the magnitude of that in the case of the normal mode. According to one embodiment, it is considered that the dependency factor k is zero in the normal mode, so that no instantaneous reserve is then fed in in the normal mode.

Therefore, it is also considered that the normal mode and the support mode differ in particular owing to this different level of the instantaneous reserve. In this case, it is also considered that the specific operating point does not differ between the normal mode and the support mode. Therefore, it is considered that, in principle, the wind power installation is operated at its optimum operating point in both modes, provided that an instantaneous reserve has not been called up, that is to say provided that the change in frequency df/dt is, for example, small enough, or if the absolute deviations in frequency from the normal network frequency, that is to say particularly the rated frequency, only occur in a small particularly negligible region.

According to one embodiment, it is proposed that, for the purpose of supporting the electrical supply network, a support power, in particular an instantaneous reserve power, is offered, which support power can be called up for the purpose of infeed into the electrical supply network, or which support power can be fed in depending on a network behavior, wherein the at least one wind power installation offers a higher support power in the support mode than in the normal mode. It is also taken into account here that the infeed of an instantaneous reserve for supporting the electrical supply network is advantageous for the network but is not necessarily advantageous for the operator of the wind power installation. Therefore, it is proposed to not offer an instantaneous reserve in the normal mode or to offer an instantaneous reserve with a lower amplitude in the normal mode than in the support mode.

Just like in the above-described different dependence on a change in frequency, this is based on the idea that the offer or infeed of a higher instantaneous reserve is advantageous particularly when the photovoltaic systems which feed into the same network feed in with a high power. In this case too, it may be provided for the at least one wind power installation to be operated at the same operating point both in the normal mode and in the support mode, provided that no instantaneous reserve and no other support power is called up. However, it is also considered, as will be explained further below, that the wind power installation is also deliberately operated at a different operating point.

According to one embodiment, provision is preferably made, in the support mode, for the wind power installation to at least temporarily feed less power into the electrical supply network than in the normal mode or for said wind power installation to draw power from the electrical supply network in order to provide an increased instantaneous reserve in this way.

In particular, the possible support power, particularly the possible instantaneous reserve, can be increased owing to a measure of this kind. To this end, the wind power installation leaves its optimum operating point because the provision or at least offer of instantaneous reserve is then the priority. In particular, this can result in such a large instantaneous reserve or other support power being provided or at least offered that this is therefore sufficient for the at least one photovoltaic system which feeds into the same network. In general, less power is fed into the network owing to said wind power installation leaving the optimum operating point. However, it can also come into consideration that another operating point is found, in which no or substantially far less power is fed into the network, but that a changeover toward this new operating point temporarily means a reduction in the power infeed. This applies particularly for a new operating point which has a higher rotational speed, wherein the acceleration to this higher rotational speed means a power loss for the rotor for the duration of the acceleration. Nevertheless, a similar amount of power as at the optimum operating point may be able to be fed in at this higher rotational speed, but perhaps with greater loading on the installation or other disadvantages.

According to one embodiment, it is proposed that the support mode comprises an idling operating mode in which the rotor of the wind power installation rotates by virtue of being driven by the wind, without generating power. Idling of the wind power installation in this way can be provided particularly when only little wind prevails. The wind power installation is then generally not commissioned because the existing wind power is insufficient to raise the power required for operating the wind power installation, with the result that no power could be fed in. Therefore, it is proposed here to deliberately permit this idling operating mode and, however, not switch off the wind power installation. The normal mode here would involve switching off the installation and the proposed support mode here is that the installation is switched on in this idling operating mode. Therefore, the rotor of the wind power installation rotates at least to a certain extent and as a result may possibly also at least briefly provide an instantaneous reserve if required.

According to a further variant, it is proposed that the support mode comprises a high rotational speed operating mode in which the wind power installation is operated at a rotational speed which is as high as possible, without feeding in power, or wherein only little power is fed in, specifically less power than would be possible at the rotational speed in the normal mode. The operating point of the wind power installation also changes here from the normal mode to the support mode. The optimum rotational speed, at which the maximum power can be generated, is now no longer set, but rather a rotational speed which is as high as possible is set. A rotational speed which is as high as possible is, in this respect, a rotational speed which can be achieved on account of the prevailing wind, wherein rotational speed limit values are naturally taken into account. Owing to this high, that is to say at least increased, rotational speed, an operating point with a high level of kinetic energy, that is to say a high level of rotational energy, is selected. This high rotational energy can then be used as instantaneous reserve if required. A high instantaneous reserve can also be provided in this way, it being possible for said high instantaneous reserve to lie above the amount which the wind power installation usually provides or would have to provide in the case of the wind here.

According to one embodiment, it is proposed that the support mode relates to a zero-power operating mode by virtue of the rotational speed being increased up to the maximum rotational speed without power infeed. This corresponds, in part, to the above-described operating mode at a rotational speed which is as high as possible. However, it is expressly proposed here that the rotational speed is moved up to the maximum rotational speed, that is to say in particular up to the rated rotational speed, and in the process power is deliberately not fed in. This also includes the case in which the installation is now operated at rated rotational speed and could still feed in power but does not feed in power. This case relates particularly to the situation in which a sufficient amount of wind is present in order to operate the wind power installation at this maximum rotational speed. Therefore, it is also possible, at least taking into account the fluctuations in wind, for the rotational speed to be further increased, but this is prevented by regulation here. In particular, the wind power installation is therefore kept at this maximum rotational speed. To this end, control is provided by means of blade adjustment, in the case of which the rotor blades are adjusted and continuously readjusted in control terms such that this maximum rotational speed is maintained. In this case, it is considered that the wind power installation generates so much power that it can therefore supply power to itself. Therefore, the wind power installation then generates power to meet its own requirements and does not feed in, but can feed in immediately if this is necessary.

According to a further embodiment, it is proposed that the support mode comprises a motorized operating mode in which the rotor of the wind power installation is driven by electrical power from the electrical supply network. In this case, this electrical power for driving the wind power installation should not exceed the solar power instantaneously fed into the electrical supply network by the solar installation. Otherwise, the solar installations may not be able to contribute to infeed into the network as a result. However, in principle, it is assumed that, in the support mode, specifically particularly when there is a large amount of solar radiation, the solar installations feed substantially more power into the electrical supply network than is necessary for this motorized operation. This is also based on the idea that said solar installations feed in a large amount of power and a little of this power is used for operating the wind power installations in the motorized operating mode but substantially under no-load conditions. The rotor blades are adjusted such that they have as little flow resistance as possible during rotation. However, this low power for driving the wind power installations renders it possible for a high instantaneous reserve to be provided owing to the rotation of the rotors of the wind power installations.

Photovoltaic systems, which therefore generate current directly from solar radiation, in particular can be assisted by the wind power installations using the proposed variants. The fed-in power of photovoltaic systems of this kind can fluctuate directly and, to all intents and purposes, immediately when the solar radiation correspondingly fluctuates. Therefore, it is not only difficult for photovoltaic systems of this kind to support the network but rather, in the event of fluctuating solar radiation, they can also contribute to fluctuations in the electrical supply network themselves if they are dominant enough. This is also taken into consideration and compensated for by the behavior of the wind power installations.

According to one embodiment, it is proposed that the changeover to the support mode depends on the prevailing wind speed. A changeover can be made to this support mode particularly in the case of weak wind. In the case of strong wind, operation of the wind power installation at an optimum operating point at which the wind power installation itself feeds in a large amount of power and therefore as a result also has an operating point at which it also has a high support potential may possibly be advantageous.

In addition or as an alternative, it is proposed that a property of the support mode depends on the prevailing wind speed. For example, in the case of low wind speeds, provision can be made to deliberately provide a high rotational speed, that is to say to change over the operating point toward a higher rotational speed, in the support mode. In the case of high wind speeds, provision can be made to not change the operating point, but to at least offer a high instantaneous reserve.

It is preferably proposed that the changeover to the support mode and in addition or as an alternative at least one property of the support mode depends on at least one network state of the electrical supply network or depends on at least one variable which represents said network state. As a result, it may be possible to anticipate whether a support mode, specifically particularly a support power or instantaneous reserve, could be needed and/or the extent to which it could be needed. The network states explained below can also be taken into consideration directly in the sense of the physical variable or else by a value representing said physical variable. The latter is also considered particularly when the respective variable, that is to say the respective the network state, is not detected directly by the wind power installation.

Therefore, a changeover or a property of the support mode is proposed depending on the network frequency. For example, a support mode may be expedient particularly when the network frequency is already at a comparatively low value, that is to say when it lies, for example, below the rated frequency but still above a lower limit value.

A change in network frequency can also provide an indication as to whether it appears that a support mode will shortly be required. In the case of a particularly steady network, that is to say when few and/or only small changes in network frequency occur, a support mode is required to a lesser extent than when the network is more unsteady in terms of changes in its frequency.

Taking into account a gradient of a change in network frequency can also be helpful in order to be able to assess whether it appears that a support mode will be required. Here, a quantitative evaluation of a change in network frequency in respect of the change in its amplitude takes place in this respect. The frequency of occurrence of the change in frequency does not play a role here. Nevertheless, it may be advantageous to take into account both the frequency of occurrence of the change in network frequency, that is to say how unsteady the network is, and also the gradient of the change in network frequency, that is to say the amplitude of the change in frequency.

A further network state is the network voltage. The need for a support mode is more likely particularly in the case of a comparatively high voltage than in the case of a lower network voltage. In this case, the property of the measurement point for this network voltage measurement should be taken into account in particular since the network voltage changes with its location in a complex electrical supply network.

It is also proposed to take into account a change in network voltage. For example, a drop in network voltage may be an indication of a support mode being required, even if the network voltage is initially still at a comparatively high value.

It is also proposed that an external network state signal which indicates a network state is taken into account. The support mode and possibly also its properties can be selected depending on said network state signal. Here, it is taken into account that the network operator operating the electrical supply network has information about the electrical supply network, particularly also of different network points. Conclusions about requirements of or expected events in the electrical supply network can be drawn more effectively depending on said information.

According to one variant, it is proposed that a frequency converter proportion, which specifies a ratio of power which is fed into the electrical supply network by frequency converters to the total power which is fed into the electrical supply network, is taken into account. When, for example, the proportion of the frequency converters in the network, that is to say only based on the power fed in by said frequency converters, is greater than 80% and the proportion of photovoltaic systems, which likewise feed into the network by means of a frequency converter, in this is greater than 50%, this can affect the electrical supply network.

One possible way of identifying the frequency converter proportion could also involve said frequency converter proportion being known to the operator of the electrical supply network and this information being passed on to the wind power installations in question.

The selection of a support mode can also be made dependent on whether a network operator transmits a corresponding request signal for requesting an instantaneous reserve, that is to say whether an instantaneous reserve is requested by a network operator. This can also mean that an instantaneous reserve of this kind at a certain level in relation to the fed-in power is requested. In this case, a power-dependent request of this kind taking into account the power infeed of the photovoltaic systems taken into account could be adjusted to an instantaneous reserve for the wind power installations which would then provide said instantaneous reserve for the solar installations.

According to one embodiment, it is proposed that the at least one wind power installation changes over to the support mode and the rotational speed thereof increases in comparison to the normal mode when the at least one solar installation feeds at least a prespecifiable minimum proportion of its rated power, in particular 50% of its rated power, into the electrical supply network and also a requirement for an instantaneous reserve has been detected. This support mode can be specifically selected in this way.

It is preferably proposed that the at least one wind power installation is permanently operated in the support mode at a rotor rotational speed which is increased in comparison to the normal mode, provided that the at least one solar installation feeds in at least a prespecifiable minimum proportion of its rated power, in particular at least 50% of its rated power, into the electrical supply network and the prevailing wind is so weak that the at least one wind power installation can feed at most a prespecifiable maximum proportion of its rated power, in particular at most 50% of its rated power, into the electrical supply network. This is particularly based on the idea that the weather situation, specifically simply a large amount of sun and little wind, is taken into account and accordingly the solar installations are used for the infeed of as much power as possible and the wind power installations are used substantially for supporting the electrical supply network, at least to the effect that they are able to deliver a support power if required.

One embodiment proposes a solution which is characterized in that a requirement for a relative instantaneous reserve is detected, wherein this relative instantaneous reserve identifies a power, which can additionally be fed in, with respect to a reference power. A solar instantaneous reserve, which is a power which identifies an instantaneous reserve which is to be kept in reserve or to be provided by the solar installation, is determined based on this detected requirement for the relative instantaneous reserve and a solar reference power which identifies the solar installation. This solar instantaneous reserve is therefore a calculation value when the instantaneous reserve which is to be provided overall is distributed in equal portions to the generators which feed in power.

To this end, it is now proposed that the at least one wind power installation is operated in a support mode such that it can provide the determined solar instantaneous reserve. It can preferably provide said solar instantaneous reserve in addition to an instantaneous reserve which it would have to feed in on account of its own operation and the relative instantaneous reserve. As a result, a unified instantaneous reserve provision in particular can be estimated in terms of magnitude. In this case, it is proposed that the generators, which cannot or can only with a high level of expenditure feed in or provide the instantaneous reserve calculated for them, allow this to be taken from wind power installations which are suitable for this purpose. The wind power installations can then take over this requirement from the solar installations in a support mode in particular.

It is preferably proposed that the relative instantaneous reserve specifies the power, which can additionally be fed in, with respect to a power which is instantaneously fed into the electrical supply network or a relevant network section. According to this proposal, the reference power is that power which is instantaneously fed into the electrical supply network or which is fed into a relevant network section.

In addition or as an alternative, the solar reference power specifies the solar power which is instantaneously fed into the electrical supply network by the solar installation. Therefore, the focus is also on the current actual value here.

In addition or as an alternative, the at least one wind power installation is then operated in a support mode such that it has an increased rotational speed in comparison to its normal mode in order to provide the solar instantaneous reserve for the solar installation in this way. In particular, said wind power installation can provide or feed in the solar instantaneous reserve in this way.

The solar instantaneous reserve is preferably calculated as the product of the relative instantaneous reserve and the instantaneously fed-in solar power. In this case, the relative instantaneous reserve can be a comparatively constant value which can be easily multiplied by the instantaneously fed-in solar power which is known in principle, at least to the respective solar installation.

It is optionally proposed that a weighting function is taken into account, in particular by way of multiplication by a positive weighting factor. Therefore, the solar instantaneous reserve can additionally be changed by a weighting function, particularly by way of said solar instantaneous reserve being multiplied by a positive weighting factor which can lie in the range of from 0.5 to 2 in particular. As a result, it is possible to readjust the solar instantaneous reserve or take into account particular conditions, such as the specific location of the network connection point in the network at which the solar installation in question feeds in for example.

Descriptions of or in connection with solar installations above and below particularly preferably relate to photovoltaic systems.

According to one embodiment, it is proposed that the method is characterized in that a solar instantaneous reserve which can be provided is calculated for the solar installation, or for a mixed installation which comprises at least one solar installation and at least one wind power installation. Said solar instantaneous reserve indicates how much instantaneous reserve the at least one wind power installation can keep in store with the assistance of the at least one solar installation when the wind power installation is operated in a corresponding support mode. To this end, it is proposed that this solar instantaneous reserve which can be provided is calculated depending on the instantaneously fed-in solar power, the wind power which is instantaneously fed in by the at least one wind power installation in the normal mode, and the network state of the electrical supply network or of the variable representing said network state. The solar instantaneous reserve which can be provided is therefore one which can be provided and can be called up as required, that is to say which is not permanently provided or even fed in. Therefore, it is the value which specifies the level up to which a solar instantaneous reserve which can be provided should be kept in store. To this end, the instantaneously fed-in solar power is included since this is intended to be supplemented by support power of the wind power installation. Said method also includes the normal mode in which the wind power installation could be operated if it does not change over to the support mode. It can also incorporate the network state of the electrical supply network since the question of whether there is a need for a support power at all can ultimately depend on said network state.

Provided is a wind power installation which can generate electrical energy from wind for infeed into an electrical supply network and wherein the wind power installation has an aerodynamic rotor with rotor blades which can be adjusted in respect of their blade angle, the rotor can be operated at a variable rotor rotational speed, and the wind power installation has a generator, which is coupled to the aerodynamic rotor, for generating a generator power, wherein the wind power installation is operated in a normal mode in which it feeds available wind power up to a rated power into the electrical supply network, wherein the available wind power indicates a power which can be obtained from the wind and fed into the electrical supply network depending on the wind and technical limitations of the wind power installation, and the wind power installation changes over from its normal mode to a support mode depending on an operating situation of at least one solar installation which feeds into the same network.

In particular, provided is a wind power installation which is primed to execute a method according to at least one embodiment as described above. To this end, said wind power installation has, in particular, a process computer on which the method is implemented. However, it is also considered that said wind power installation is connected to external computers and/or has corresponding interfaces in order to be able to take into account the necessary external variables for the method. Some of the method can also be executed or controlled on an external process computer.

There is preferably a weather module for evaluating and/or recording weather data, which weather module can also detect the amount of solar radiation. This is based on the finding that detecting the solar radiation at the at least one wind power installation can provide enough information about an available photovoltaic power of a photovoltaic installation in the vicinity. The weather module can have a photocell for measuring the light and/or an interface for receiving external weather data.

A wind farm comprising a plurality of wind power installations is provided. The wind farm therefore has at least two wind power installations as described above and said at least two wind power installations feed into the electrical supply network via a common network connection point. As a result, the method can be employed in a particularly efficient manner owing to the use of a plurality of wind power installations because a high potential instantaneous reserve or other support power can be created as a result.

Additionally, provided is a wind power system which comprises at least one wind farm as described above and at least one solar installation, wherein the at least one solar installation feeds into the same electrical supply network. In this case, said solar installation can preferably feed into the electrical supply network via a different network connection point than the wind farm. This has the effect that, in principle, both the wind farm and also the at least one solar installation can be operated independently of one another. Nevertheless, a synergy is created, in the case of which the wind power installations, that is to say the wind farm, perform/performs support tasks, particularly the provision of support power or instantaneous reserve, for the solar installation. This is performed by way of the wind power installation in each case changing over from its normal mode to a support mode depending on an operating situation of the at least one solar installation.

BRIEF DESCRIPTION OF THE SEVERAL VIEWS OF THE DRAWINGS

The invention is explained in more detail by way of example using embodiments with reference to the accompanying figures.

DETAILED DESCRIPTION

Figure 1:
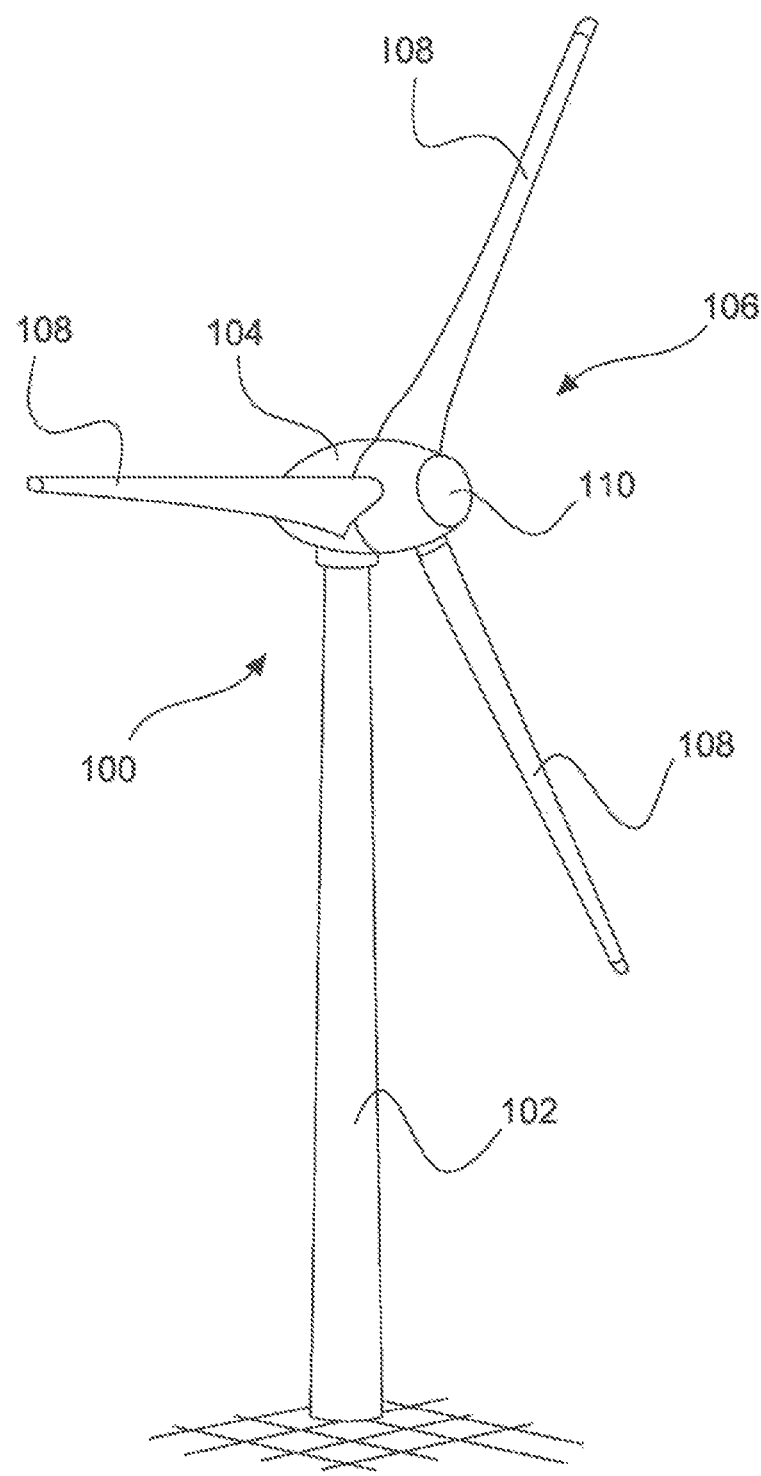
FIG. 1 shows a perspective illustration of a wind power installation.

FIG. 1 shows a wind power installation 100 with a tower 102 and a nacelle 104. A rotor 106 with three rotor blades 108 and a spinner 110 is arranged on the nacelle 104. During operation, the rotor 106 is set in rotation by the wind and in this way drives a generator in the nacelle 104.

Figure 2:
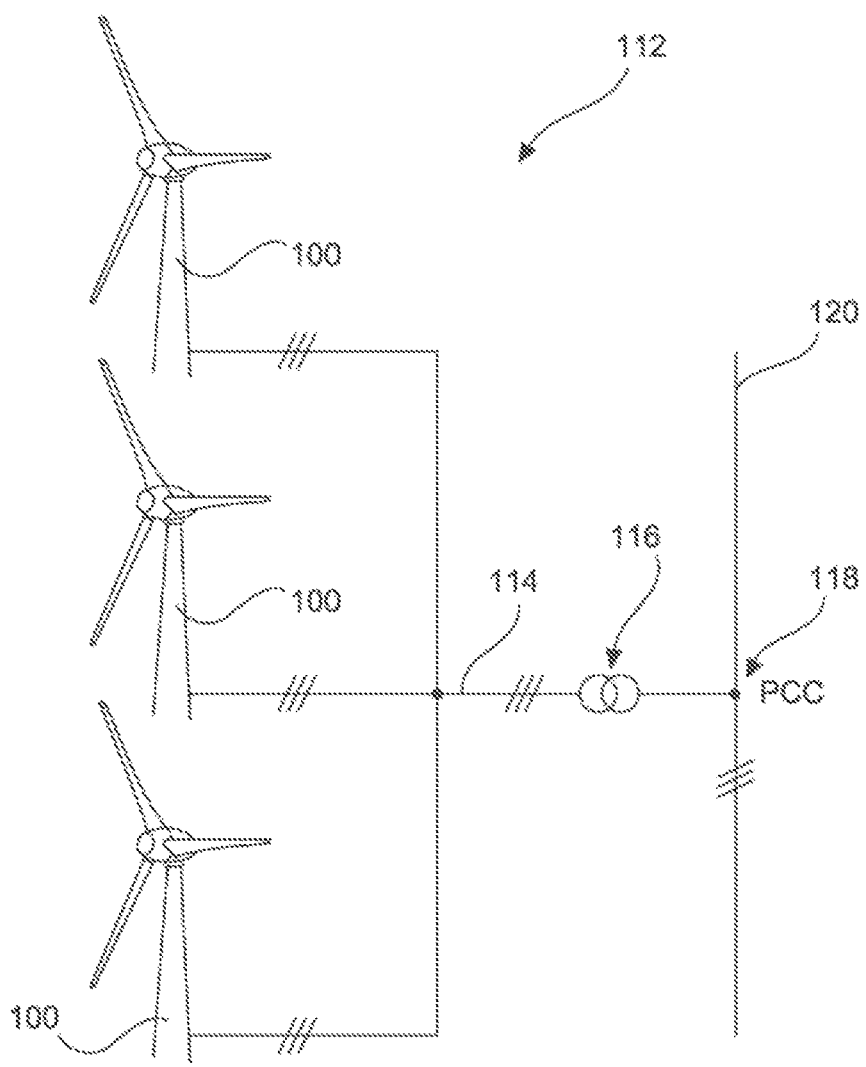
FIG. 2 schematically shows a wind farm.

FIG. 2 shows a wind farm 112 having, by way of example, three wind power installations 100 which may be identical or different. The three wind power installations 100 are therefore representative of basically any desired number of wind power installations of a wind farm 112. The wind power installations 100 provide their power, specifically, in particular, the generated current, via an electrical farm grid 114. In this case, the respectively generated currents or powers of the individual wind power installations 100 are added together and a transformer 116, which steps up the voltage in the farm, is usually provided in order to then feed into the supply network 120 at the infeed point 118, which is also generally referred to as a PCC. FIG. 2 is only a simplified illustration of a wind farm 112, which does not show, for example, a control system, although a control system is present, of course. The farm grid 114 can also be designed differently, for example, wherein, for example, a transformer is also present at the output of each wind power installation 100, to mention just one other exemplary embodiment.

Figure 3:
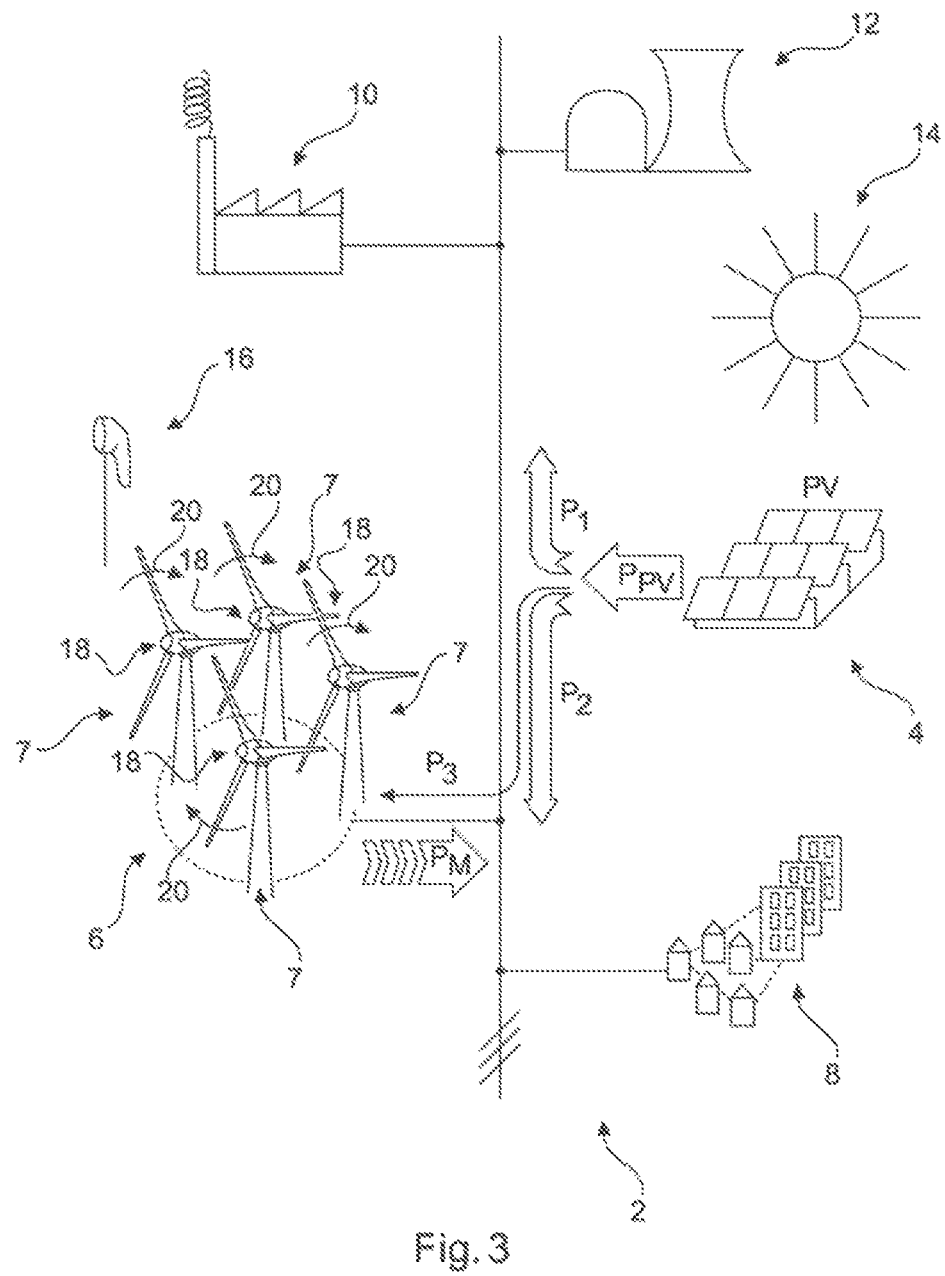
FIG. 3 schematically shows a detail of an electrical supply network.

FIG. 3 shows a detail of an electrical supply network 2 to which a photovoltaic system 4 and a wind farm 6 comprising wind power installations 7 are connected, as is schematically illustrated. The wind farm 6 can be designed like the wind farm 112 of FIG. 2 and have wind power installations 7 respectively like the wind power installation 100 of FIG. 1. The electrical supply network 2 can correspond to the electrical supply network 120 of FIG. 2.

To represent further loads or infeed devices, FIG. 3 shows a city 8 which is connected to the electrical supply network 2, an industrial load 2 which can be a factory for example, and, as a further generator, a large power plant 12.

The schematically indicated sun 14 and the limp wind sock 16 are intended to indicate that FIG. 3 shows the general weather situation for the electrical supply network 2 shown, in the case of which weather situation strong solar radiation prevails and there is little wind. Accordingly, the photovoltaic system 4, which can also be referred to as PV system for simplicity, generates a large amount of electrical power $P_{PV}$ which is output to the electrical supply network 2. The thickness of the arrow and of the further arrows still to be described is also intended to at least illustrate the power level in each case. Therefore, a large amount of PV power ($P_{PV}$) is fed into the electrical supply network, said PV power being split into the power components $P_1$ and $P_2$ which flow into different regions of the electrical supply network 2. This serves only for illustration purposes in order to show that said power $P_{PV}$ which is generated by the PV system 4 is generally available to the electrical supply network 2.

In addition, a power component $P_3$ is indicated by a thin arrow and is therefore intended to make up only a small proportion of the fed-in PV power $P_{PV}$. Said further power fraction $P_3$ is available to the wind farm 6. It should be noted that this also serves only for illustration and said power fraction $P_3$ does not have to originate directly from the PV system 4. Rather, what matters is that the wind farm 6 draws a power fraction $P_3$ which is considerably lower than the power $P_{PV}$ fed in by the PV system. Therefore, the power fraction $P_3$ can, at least mathematically, be a fraction of the PV power $P_{PV}$ fed in in total.

In this illustration of FIG. 3, it is therefore assumed that the wind farm 6 cannot generate any power from wind in the situation shown. Accordingly, the power component $P_3$ is used to set the rotors 18 in rotation 20. The rotors 18 can correspond to the rotors 106 according to FIG. 1. The rotation 20 is indicated by corresponding arrows in FIG. 3.

Therefore, the rotors 18 of the wind farm 6 are set in rotation and are kept in rotation. The power component $P_3$ can be used for this purpose. The wind power installations 7 of the wind farm 6 and therefore, as a result, also the wind farm 6 as such are therefore in a support mode. In the situation shown in FIG. 3, in which there is no wind, the normal mode would be that the wind power installations are switched off or at best are kept in a standby operating mode.

On account of these rotors 18 each being set in rotation 20, each wind power installation 7 has kinetic energy in the form of rotational energy of the respective rotor 18. Therefore, the wind farm 6 has a high quantity of rotational energy overall. Purely by way of precaution, it should be noted that four wind power installations 7 are shown only schematically in the wind farm 6, but considerably more wind power installations, for example more than 20, more than 50 or even more than 100 wind power installations 7, can be present in the wind farm and can be operated as described.

This rotational energy which is present can be fed in as instantaneous reserve power $P_M$ as required for the purpose of supporting the electrical supply network 2. A wide arrow is shown in interrupted form for illustrating this. This is intended to illustrate that said instantaneous reserve power ($P_M$) may possibly be fed in, but that it is not fed in permanently, but rather only at brief moments in which corresponding support of the electrical supply network 2 is required. However, a large support power $P_M$ can then also be fed in.

The infeed of support power $P_M$ of this kind in this way may be required, for example, when the industrial load 10 is connected to the electrical supply network 2 or when a large amount of power is suddenly drawn in the city 8.

FIG. 3 illustrates a type of support mode for a particular situation, specifically in which there is absolutely no wind. However, other variants also come into consideration, such as, for example, that there is a sufficient amount of wind in order to feed at least a certain amount of power into the electrical supply network 2 by way of the wind farm 6. According to one variant, the wind farm 6 and therefore the wind power installations 7 would be operated at an optimum operating point at which particularly the rotational speed of the rotors 18 is at a value which is optimum for the prevailing wind. This operating point can be maintained for the selection of the support mode. Nevertheless, a high value of instantaneous reserve power $P_M$ is offered. This may mean that a different dependency to that in the normal mode is used as a basis for infeed of the instantaneous reserve power $P_M$, which infeed is dependent on a change in frequency.

Figure 4:
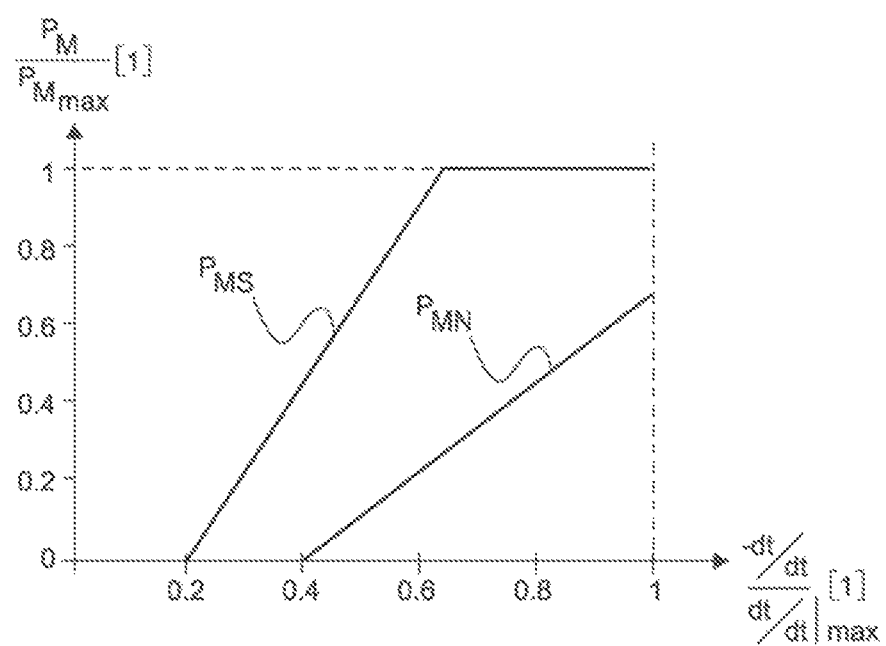
FIG. 4 illustrates possible relationships between an instantaneous reserve power and a change in frequency in the electrical supply network.

A situation of this kind is illustrated by way of example in FIG. 4. In the graph of FIG. 4, an instantaneous reserve power $P_M$ is plotted as a function of the change in frequency df/dt for two cases. The instantaneous reserve power $P_M$ is standardized to an instantaneous reserve power ($P_{Mmax}$) which can be fed in at most and which is identical for both modes of operation. The change in frequency of the electrical supply network df/dt is also standardized, specifically to a maximum df/dt. –df/dt is also plotted. Therefore, the graph of FIG. 4 shows, in principle, negative values of the change in frequency df/dt. The standardized abscissa therefore ranges from 0 to –1.

Two dependency functions for the instantaneous reserve power $P_M$, specifically the instantaneous reserve power ($P_{MS}$) for the support mode and the instantaneous reserve power ($P_{MN}$) for the normal mode, are indicated by way of example.

In this illustrative example, the gradient of the instantaneous reserve power $P_{MS}$ for the support mode is twice the magnitude of the gradient of the instantaneous reserve power $P_{MN}$ for the normal mode. In addition, the instantaneous reserve power $P_{MS}$ is also called up earlier in the support mode, that is to say in the case of a change in frequency df/dt which is relatively small in respect of magnitude, than the instantaneous reserve power $P_{MN}$ which here is called up by way of example only starting from a change in frequency df/dt which is twice the magnitude.

To the extent that the instantaneous reserve power $P_M$ is understood to be a function depending on the change in frequency which exceeds a starting limit value, the instantaneous reserve power $P_{MS}$ of the support mode in each case delivers a value which is twice the magnitude of the instantaneous reserve power $P_{MN}$ of the normal mode. For example, the instantaneous reserve power $P_{MS}$ of the support mode has a standardized power value of somewhat more than 0.4 in the case of a standardized change in frequency of 0.4, that is to say at 0.2 above its start value, whereas the instantaneous reserve power $P_{MN}$ of the normal mode has a standardized power value of approximately 0.2 in the case of the standardized value for the change in frequency of 0.6, that is to say 0.2 above its start value, and therefore half the corresponding value of the instantaneous reserve power $P_{MS}$ of the support mode.

This is also only an explanatory example and it is also considered, for example, that the two start values of the normal mode and of the support mode are identical and/or zero.

Therefore, it has been identified that, under certain circumstances, a requirement for instantaneous reserve provision can be provided by converter-based generation systems in the case of a high level of coverage by regenerative energies during power generation. In this case, it has been found that PV systems can implement instantaneous reserve only by way of the integration of an additional storage means. For this purpose, it is now proposed to also use wind power installations for providing instantaneous reserve when the wind is not blowing but, as a result of solar radiation, a large amount of PV current is proportionally fed in. One proposal for this is to bring the wind power installations up to rotational speed by motor in order to support the network from the rotor energy or rotational energy in the case of an instantaneous reserve requirement. This is also based on the finding that, at least statistically, generally hardly any wind power is fed in and therefore the capacitors of the wind power installation converters are hardly utilized in the case of a high level of coverage of the power requirement by PV. However, there are also other possible ways of implementation, as have already been explained above.

One aim is also to generally improve the network integration of renewable energy sources as much as possible. Since, in principle, an instantaneous reserve provision may be required in the network at any time, one idea is to implement said instantaneous reserve provision by way of wind power installations. In this case, it has been found that wind power installations are generally very well suited to providing instantaneous reserve since the rotor mass, in particular the moment of mass inertia, of each rotor is very high in relation to the installed power.

Therefore, an improvement in the network integration of renewable energies can be achieved very generally and in particular for wind power installations and photovoltaic systems, and therefore a high level of coverage can be achieved by renewable energy sources during power generation. Conventional power plants can also be replaced by power plants which are based on wind power installations. In addition, a network-related upper limit for the addition of renewable energy sources which could be set or are already present on account of the lack of network support can be avoided or at least increased. In principle, fully converter-fed networks can be created or at least can be created more effectively by way of the proposed solutions.

A motorized operating mode or idling operating mode of the wind power installations for providing instantaneous reserve by the kinetic energy of the rotor is also proposed as a solution, amongst others. One important advantage is avoiding rotating phase shifters and/or avoiding the installation of storage devices in photovoltaic systems (PV systems) for providing instantaneous reserve. Therefore, it is possible not only to generally lower the costs of network integration of renewable energies, but rather the proposed solution also offers the operators of wind power installations the option of offering an additional system service. A functionality of this kind can be implemented, in particular, in the installation or farm control arrangement.

The invention claimed is:

1. A method for controlling at least one wind power installation for generating electrical energy from wind for feeding into an electrical supply network, comprising:
    operating the at least one wind power installation in a normal mode in which the at least one wind power installation feeds, into the electrical supply network, available wind power up to a rated power, wherein the available wind power is a power obtained from the wind and fed into the electrical supply network depending on the wind and technical limitations of the wind power installation; and
    switching; operating the at least one wind power installation from the normal mode to a support mode depending on an operating situation of at least one solar installation which feeds into the electrical supply network, wherein:
        the at least one wind power installation has an aerodynamic rotor with rotor blades having adjustable blade angle;
        the aerodynamic rotor is operable at a variable rotor rotational speed; and
        the at least one wind power installation has a generator, coupled to the aerodynamic rotor for generating a generator power.

2. The method as claimed in claim 1, comprising:
providing by the at least one wind power installation, more instantaneous reserve power in the support mode than in the normal mode.

3. The method as claimed in claim 2, comprising:
    detecting a network frequency of the electrical supply network; and
    feeding the instantaneous reserve power into the electrical supply network depending on a change in the network frequency wherein a dependency on the change in the network frequency is different in the normal mode than in the support mode.

4. The method as claimed in claim 3, wherein in a case of a same change in the network frequency, a magnitude of the instantaneous reserve power in the support mode is greater than the magnitude of the instantaneous reserve power in the normal mode by a multiplicative dependency factor.

5. The method as claimed in claim 1, comprising:
    providing, by the at least one wind power installation, a support power for supporting the electrical supply network, wherein the support power is fed into the electrical supply network or fed into the electrical supply network depending on a network behavior, wherein the support power is higher in the support mode than in the normal mode.

6. The method as claimed in one of the preceding claims, characterized in that claim 1, comprising:
    at least temporarily feeding less power into the electrical supply network in the support mode than in the normal mode or drawing power from the electrical supply network to increase instantaneous reserve in this way.

7. The method as claimed in claim 1, wherein the support mode of the at least one wind power installation includes at least one operating mode selected from a list comprising:
    an idling operating mode in which the aerodynamic rotor of the at least one wind power installation rotates by virtue of being driven by the wind without generating power,
    a high rotational speed operating mode in which the aerodynamic rotor of the at least one wind power installation rotates at a higher rotational speed with no power or substantially no power fed in;
    a zero-power operating mode in which the rotational speed is increased up to a maximum rotational speed without power infeed; and
    a motorized operating mode in which the aerodynamic rotor of the at least one wind power installation is driven by electrical power from the electrical supply network that does not exceed a solar power instantaneously fed into the electrical supply network by the solar installation.

8. The method as claimed in claim 1, wherein at least one of: switching operating the at least one wind power installation from the normal mode to the support mode or
    at least one property of the support mode depends on a prevailing wind speed.

9. The method as claimed in claim 1, wherein:
    at least one of: switching operating the at least one wind power installation from the normal mode to the support mode depends on at least one network state of the electrical supply network,
    at least one property of the support mode depends on the at least one network state, or a variable representing the at least one network state depends on the at least one network state, and
    the at least one network state of the electrical supply network is selected from a list comprising:
        a network frequency;
        a change in the network frequency;
        a gradient of the change in the network frequency;
        a network voltage;
        a change in the network voltage;

an external network status signal indicating network state;

a frequency converter proportion specifying a ratio of a power fed into the electrical supply network by frequency converters to a total power fed into the electrical supply network; and a request signal, received from a network operator, for requesting an instantaneous reserve.

10. The method as claimed in claim 1, comprising:
increasing a rotational speed of the aerodynamic rotor in the support mode than in the normal mode when:
the at least one solar installation feeds, into the electrical supply network, at least a prespecifiable minimum proportion of a solar installation rated power of the at least one solar installation, and
a requirement for an instantaneous reserve has been detected.

11. The method as claimed in claim 10, wherein the prespecifiable minimum proportion of the solar installation rated power is 50% of the solar installation rated power.

12. The method as claimed in claim 1, comprising:
operating the at least one wind power installation in the support mode at a rotor rotational speed that is higher than the rotor rotational speed of the normal mode provided that,
the at least one solar installation feeds, into the electrical supply network, at least a prespecifiable minimum proportion of a solar installation rated power of the at least one solar installation; and
the at least one wind power installation can feed, into the electrical supply network, at most a prespecifiable maximum proportion of the rated power.

13. The method as claimed in claim 12, wherein the prespecifiable minimum proportion is 50% of the solar installation rated power and the prespecifiable maximum proportion is 50% of the rated power of the at least one wind power installation.

14. The method as claimed in claim 1, comprising:
detecting a requirement for a relative instantaneous reserve that identifies a power to be additionally fed in, with respect to a reference power;
determining, based on the requirement for the relative instantaneous reserve and a solar reference power which identifies the at least one solar installation, a solar instantaneous reserve as a power which identifies an instantaneous reserve to be kept in reserve or to be provided by the at least one solar installation; and
operating the at least one wind power installation in the support mode such that the at least one solar installation provides the solar instantaneous reserve.

15. The method as claimed in claim 14, wherein:
the relative instantaneous reserve specifies the power that additionally be fed in with respect to a power instantaneously fed into the electrical supply network or a relevant network section;
the solar reference power specifies a solar power instantaneously fed into the electrical supply network by the at least one solar installation; and/or
the at least one wind power installation is operated in the support mode such that it has an increased rotational speed compared to the normal mode to provide the solar instantaneous reserve for the at least one solar installation.

16. The method as claimed in claim 14, comprising:
determining the solar instantaneous reserve as a product of the relative instantaneous reserve and the solar power instantaneously fed into the electrical supply network.

17. The method as claimed in claim 16, comprising:
multiplying the solar instantaneous reserve by a positive weighting factor.

18. The method as claimed in claim 1, comprising:
determining a solar instantaneous reserve specifying an instantaneous reserve the at least one wind power installation keeps in reserve with an assistance of the at least one solar installation when the at least one wind power installation is operated in the support mode based on an instantaneously fed-in solar power, the wind power instantaneously fed in by the at least one wind power installation in the normal mode, and a network state of the electrical supply network or of a variable representing the network state, wherein the at least one solar installation is operated or a mixed installation which includes a solar installation and the at least one wind power installation.

19. A first wind power installation for generating electrical energy from wind for feeding into an electrical supply network, comprising:
an aerodynamic rotor having a variable rotor rotational speed and rotor blades having adjustable blade angles;
a generator, coupled to the aerodynamic rotor, for generating a generator power, and
a process computer configured to:
operate the first wind power installation in a normal mode in which the first wind power installation feeds available wind power up to a rated power into the electrical supply network, wherein the available wind power is a power obtained from the wind and fed into the electrical supply network depending on the wind and technical limitations of the first wind power installation; and
switch operation of the first wind power installation from the normal mode to a support mode depending on an operating situation of at least one solar installation which feeds into the electrical supply network.

20. A wind farm comprising at least two wind power installations including the first wind power installation as claimed in claim 19 and a second wind power installation, wherein the at least two wind power installations feed into the electrical supply network via a common network connection point.

21. A wind power system comprising at least one wind farm as claimed in claim 20 and the at least one solar installation, wherein the at least one solar installation feeds into the electrical supply network via a different network connection point, and wherein each wind power installation of the at least two wind power installations switched from the normal mode to the support mode depending on the operating situation of the at least one solar installation.

* * * * *

UNITED STATES PATENT AND TRADEMARK OFFICE
CERTIFICATE OF CORRECTION

PATENT NO. : 10,683,846 B2
APPLICATION NO. : 16/326574
DATED : June 16, 2020
INVENTOR(S) : Johannes Brombach et al.

It is certified that error appears in the above-identified patent and that said Letters Patent is hereby corrected as shown below:

In the Claims

Column 15, Claim 1, Line 50:
"switching; operating" should be: --switching operating--.

Column 16, Claim 6, Lines 21-22:
"The method as claimed in one of the preceding claims, characterized in that claim 1, comprising:"
should be: --The method as claimed in claim 1, comprising:--.

Column 16, Claim 6, Line 26:
"instantaneous reserve in this way." should be: --instantaneous reserve.--.

Column 17, Claim 9, Lines 1-2:
"indicating network state;" should be: --indicating a network state;--.

Column 17, Claim 10, Line 15:
"installation, and" should be: --installation; and--.

Column 17, Claim 12, Line 25:
"provided that," should be: --provided that:--.

Column 17, Claim 14, Lines 40-41:
"fed in, with respect" should be: --fed in with respect--.

Column 17, Claim 15, Line 52-53:
"power that additionally" should be: --power that can additionally--.

Signed and Sealed this
Fifth Day of January, 2021

Andrei Iancu
*Director of the United States Patent and Trademark Office*